May 18, 1965 C. W. GEER 3,184,630

THREE-DIMENSIONAL DISPLAY APPARATUS

Filed July 12, 1960 2 Sheets-Sheet 1

INVENTOR
CHARLES WILLARD GEER
BY HIS ATTORNEYS
HARRIS, KIECH, RUSSELL & KERN

INVENTOR
CHARLES WILLARD GEER
BY HIS ATTORNEYS
HARRIS, KIECH, RUSSELL & KERN

United States Patent Office 3,184,630
Patented May 18, 1965

3,184,630
THREE-DIMENSIONAL DISPLAY APPARATUS
Charles Willard Geer, 5369 Stillwater Drive,
Los Angeles 56, Calif.
Filed July 12, 1960, Ser. No. 42,346
15 Claims. (Cl. 313—70)

This invention relates to electronic apparatus, and more particularly to television tubes and screens to obtain three-dimensional effects, the present improvement being also applicable for use with radar screens.

The principal object of this invention is to make possible the presentation of three-dimensional images at the front of a cathode ray tube, more particularly a television tube with its usual television screen, so that a viewer in front of such television screen will observe a three-dimensional picture such as recorded by a three-dimensional or stereoscopic camera viewing the original subject.

An additional object of the invention is to accomplish three-dimensional images on a television screen so that people with normal binocular vision will be able to see images in three-dimensional form without the necessity for use of polarizing lenses or other opthalmic devices.

An additional object of the invention is to provide a television screen for a television or cathode ray tube to be used in conjunction with a stereoscopic or two-lens electron camera viewing the original subject, whereby an observer seated in front of the television tube may readily adjust himself with respect to the viewing screen of the television tube so that he may view pictures on the television screen with three-dimensional effects.

A still further object of the invention is to provide a television tube or the like having two electron guns arranged to project beams angularly toward the viewing screen of the television tube and to be used in conjunction with a stereoscopic television camera, that is a television camera having two electron eye pieces or electron lenses to operate synchronously the two electron guns of the tube for energization of spots on the television screen as the screen is alternately scanned by the respective guns, activation on the inner screen surface being accomplished in successive scanning sweeps to provide successive effects for the right and left eyes in synchronism and in conformity with the action of the two stereoscopic electron lenses of the television camera, such lenses being spaced apart the distance of the normal spacing of the human eyes, and corresponding, stereoscopic effects being reproduced on the screen of the television tube. The delay necessary to produce alternating energization of phosphors at the back of the screen whereby to yield stereoscopic effects is readily accomplished by known means.

Another object of the invention is to provide a television screen for a television tube to produce three-dimensional or stereoscopic effects through the medium of a glass or plastic screen structure of appreciable thickness wherein the inner wall is vertically grooved to provide separated angular surfaces for impingement thereon of the scanning beams from the respective electron guns, and the forward or outward face of the screen is provided with a multiplicity of corresponding corrugations or undulations providing columnar lens-like structures or lenticules which also are vertically disposed on the screen and are therefore arranged substantially at right angles to the scanning movement of the electron gun beams which energize the phosphors carried by a corresponding number of the vertical grooves disposed opposite the respective corrugations.

Other objects of the invention and various features of construction thereof will become apparent to those skilled in this art upon reference to the following specification and the accompanying drawings.

Figure 5:
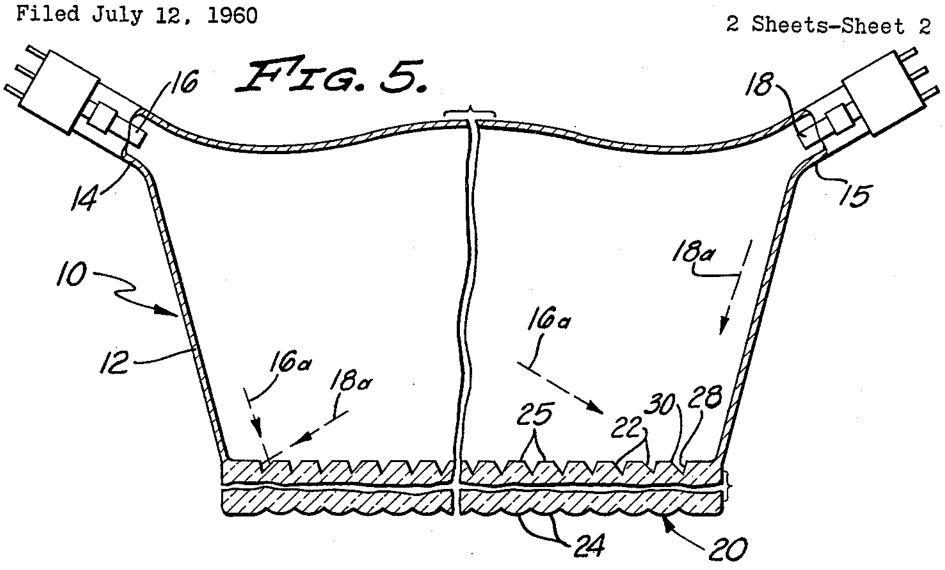
Figure 6:
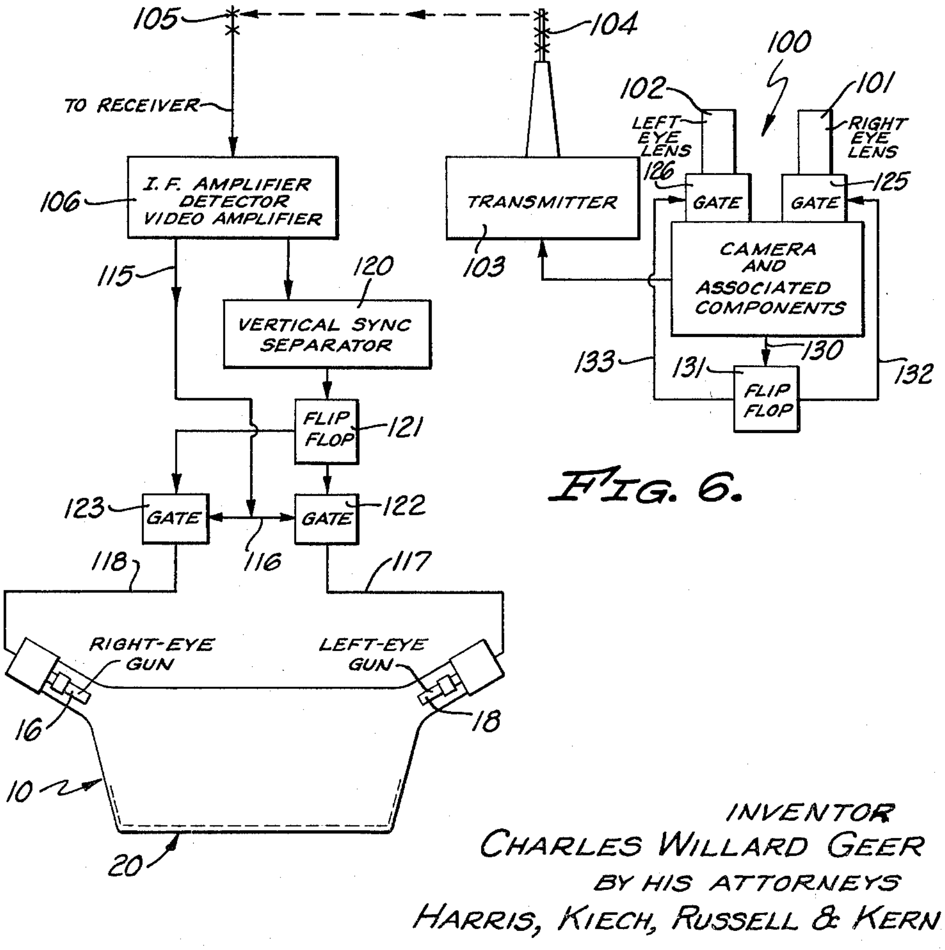

FIG. 5 is an expanded view diagrammatically indicating how the angularity of the grooves on the inside of the screen may be varied with respect to the axes of the electron guns in their scanning movement between nearest grooves and most remote grooves; and FIG. 6 is a block diagram of an electrical system usable with the present three-dimensional television tube and an associated television camera.

In the drawings, FIGS. 1 to 5 particularly illustrate the construction of the television screen in accordance with this invention and the relation of the two mentioned electron guns of the television tube to such screen and its parts. The television tube, which is generally indicated at 10 and is typically an evacuated glass bulb, comprises a main housing which has a generally circular side wall 12, a pair of diametrically located gun necks 14 and 15 which carry a corresponding pair of electron guns 16 and 18 arranged to scan the inner wall of a translucent television screen 20 constructed in accordance with this improvement. The showing of screen 20 is to a considerable extent diagrammatic in that the various proportional relationships which are shown on a large scale are actually representative of minute lens portions or lenticules, as hereinafter more fully described.

Figure 2:
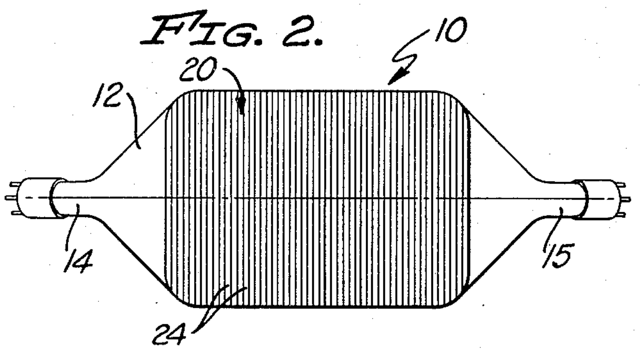
FIG. 2 is a front elevation of the tube of FIG. 1.

As best illustrated in FIG. 2, the axes of the electron gun necks 14 and 15 and of the electron guns 16 and 18 are preferably disposed to lie in a horizontal plane which perpendicularly intersects the screen 20, whereby to impinge the electrons from the respective guns 16 and 18 upon substantially flat respective side walls of a multiplicity of grooves 22 which, from the standpoint of a viewer of the screen 20, extend vertically with respect to the axes of the guns 16 and 18 and the transverse plane in which they are disposed. On the front wall of the screen 20, which is the outside screen wall, there is disposed a multiplicity of lenticules 24 whose convex curvatures are directed outwardly, such small lenses 24 extending vertically in correspondence with the grooves 22 in number and arrangement and in cooperative relation therewith, as presently to be described.

The screen 20 typically may be formed as a sheet of glass of known television tube characteristics or a sheet of soft moldable glass or other suitable moldable material capable of forming a part of the rigid envelope of the interior of an electron tube. These screen sheets or materials from which they are produced may be somewhat milky if preferred. The screens 20 may be made separately from other portions of the tube 10, and thereafter secured and sealed to the wall 12. It is understood, however, that the screen may also be made separately and suspended within the tube, in which case a clear window may be secured and sealed to the wall 12.

With respect to dimensions, the width of each elongated vertical lenticule 24 will ordinarily be around one-fifteenth or tenth of the thickness of the screen 20. Thus, the screen may have a thickness of about three millimeters, in which case the width of a lenticule 24 will be around one-fourth to three-tenths millimeter, or the screen thickness may be about five millimeters and the width of a lenticule around 0.5 millimeter. In general, therefore, the width of a lenticule will be a function of the screen thickness. The shape of a lenticule 24 is probably more accurately defined as being a fragment of a cylinder, or the whole lenticular structure of the outer face of the screen may be said to be corrugated, or undulated, or columnar, but for convenience here, even though the small lens-like lenticules 24 are elongated, the screen face 24 will sometimes be referred to as lenticular or having a lenticular formation. Generally, however, the width of a single lenticule 24 may be considered as being in the order of one-tenth to one-fifteenth the thickness of the television screen 20 between its innermost wall portions and its outermost wall portions.

With respect to the grooves 22 on the inner or inside wall of the television screen 20, these are generally formed to provide included angles between about 50° and 60°. The grooves 22 lie between flat innermost barrier or face portions 25 of the screen 20, and such flat portions may represent about one-half of the width of the screen. In fact, these flat separating portions 25 in practice preferably occupy around one-half of the over-all area of the inner wall of the television screen 20, and a black coating material 26 is used on such barriers or flat portions 25 to cut down reflections which might otherwise be produced by the flat portions 25. Narrower grooves 22 with wider flat portions 25, such grooves 22 still providing angles of 60° or less, yield better definition than wider grooves, even though wider groove angles and wider grooves provide better lighting. Therefore, the groove angle and groove width are selected as functions of lighting and definition. Thus, the angles of the grooves might be as little as 30° for greater sharpness or definition. Probably around 12% to 15% of the surface of the inner screen wall, to obtain maximum sharpness, is as little as could be occupied by the grooves 22 while still obtaining adequate lighting. On the other hand, a maximum of 75% occupancy of the inner wall of the screen by the grooves probably represents a maximum of the lighting while at the same time avoiding blur.

Figure 4:
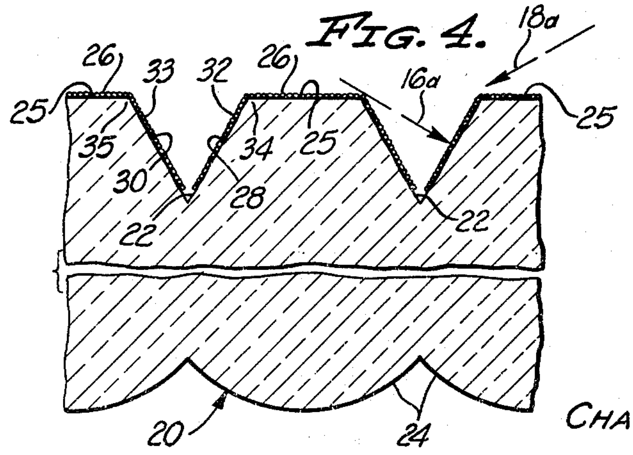
FIG. 4 is a still further enlarged fragmentary detail showing the mounting of phosphors on the walls of one of the grooves at the back of the screen, the deposition of black coloring on flat portions at the back of the screen between the grooves, the relationship of electron beams from the two guns with respect to the tops of the grooves being also indicated.

Each groove 22 is defined by a right wall 28 and a left wall 30. These walls 28 and 30 are respectively coated with a phosphor which is energized by the electron beams to give the required lighting effect. While the same phosphor is used for both walls, for convenience of designation the phosphor on the right wall 28 is designated at 32 and the phosphor on the left wall is designated at 33. As also seen in FIG. 4, a shoulder 34 is formed at the junction between each groove wall 28 and the adjacent flat area 25, and a shoulder 35 is formed between each groove wall 30 and the corresponding flat surface 25. In the preferred construction, in order to obtain the proper lighting and definition, while avoiding overplay and resultant blur or confusion, the electron gun 18 is disposed around to the right side of the wall 12 of the tube 10 so as to reduce its beam angle with respect to the flat over-all wall portions 25 of the screen 20 to form an angle with such inner wall 25 of about 60°, the groove angle 22 being about 60° or a little less, whereby the shoulder 34 blocks off the electrons from striking phosphors on the groove wall 28. Similarly the electron gun 16 is disposed around to the left so that the shoulder 35 blocks off electron beams from the gun 16 to avoid striking and energizing the phosphors 33 on the groove wall 30. The beam angle for the gun 18 is indicated at 18*a*, and the beam angle for the electron gun 16 is indicated at 16*a*. While an angle of 50° to 60° for the grooves 22 is preferred, it would be possible to increase this angle to perhaps as much as 90° by reducing the angles of the beams 16*a* and 18*a* to much less than 60°, whereby to avoid overplay and avoid striking the phosphors on the near walls 30 and 28 respectively. However, an arrangement wherein the angle of the grooves 22 is at least a little less than 60°, and the angles of the beams 16*a* and 18*a* with respect to the flat wall portions 25 are a little less than 60° is preferred. The angles of the grooves 22 could be as little as 30° if desired in which case the beam angles could be more than 60°, so long as overplay of the beams is avoided.

A variation in the arrangement of the walls of the grooves 22 is indicated in the broken view of FIG. 5. Here, as the right side of the screen 20 is approached, the right groove walls 28 are made somewhat steeper and the left groove walls 30 somewhat flatter. In this manner, electron beams following the lines 16*a* in their scanning operation impinge more nearly perpendicularly upon the phosphors on such walls 28 at the right of the tube, and the electron beams 18*a*, by reason of the lowering or flattening of the walls 30 at the right side of the screen 20, impinge somewhat more directly on such walls 30. Similarly, at the left-hand side of the tube the right walls 28 are lowered or flattened while the left walls 30 are disposed at a steeper angle. At the middle of the screen 20 the walls 28 and 30 are symmetrically disposed.

Figure 1:
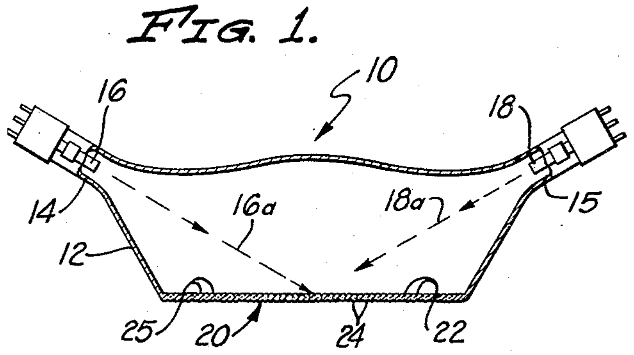
FIG. 1 is a horizontal section through a television tube constructed in accordance with this invention.
Figure 3:
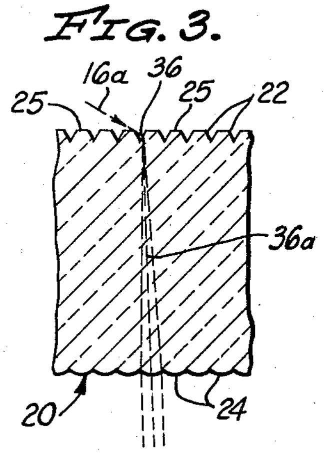
FIG. 3 is a very much enlarged detailed sectional view of a portion of the screen of FIG. 1 and is used to illustrate the travel of light rays from a spot of light produced by the focusing of one of the electron guns at one position on the back of the screen for viewing by one eye of the observer.
Figure 3A:
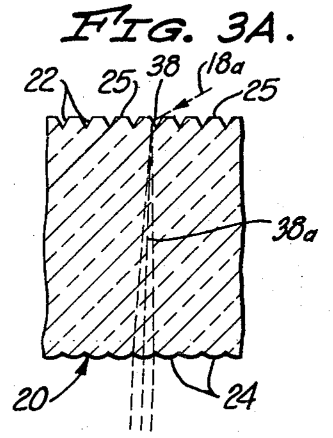
FIG. 3A is a view similar to that of FIG. 3 illustrating the movement of light rays from a spot of light from the other electron gun in the next instant of operation.

As is apparent from the relationships indicated in FIGS. 3, 3A, 4 and 5, the electron gun 16 at the left side of the television tube 10 corresponds with the right eye of the observer because the electron beams following the beam lines 16*a* strike the right walls 28 of the various grooves 22, whence a spot of light produced during the scanning operation by a beam 16*a* on the phosphor 32 has its rays generally distributed through the screen structure 20 to the outer arcuate surface of the respective lenticule 24 from which the rays for the right eye are directed in parallel toward the viewer's right eye, as they leave the front of the screen, as indicated in FIG. 3. Similarly electron beams from the electron gun 18 at the right act, in the next sweep, on the phosphors 33 on the groove walls 30 a sixtieth of a second later (when using 60-cycle electric current) to produce a spot of light by energization of such phosphors, the rays from which pass similarly through the screen 20 to the same lenticule 24, the respective light rays being then passed by the surface of the lenticule 24 in parallelism for the benefit of the left eye of the viewer as indicated in FIG. 3A. The mentioned spot of light for the right eye is, for convenience, indicated at 36, the resultant light rays 36*a* (FIG. 3), which are the result of the action of the right-eye gun 16, thus passing to the observer's right eye. Similarly the spot of light 38 indicated in FIG. 3A resulting from the action of electron beams from the left-eye electron gun 18 propagates light rays 38*a* for the benefit of the observer's left eye.

With reference to the formation of the television screen 20 this may be produced from an appropriate glass or from an appropriate moldable material of adequate hardness and rigidity, as previously indicated. The outer or forward wall of the screen 20, which is provided with the indicated multiplicity of arcuate vertically extending rounded or lenticular ribs 24 will be formed by molding as in a mold, or by rolling thereover an appropriately shaped roller while the glass or other material is in a heated or other moldable condition. The inner wall of the screen 20, which is initially flat, is ruled or otherwise grooved, in accordance with conventional practices, to yield a multiplicity of V-shaped grooves 22 above described. Preferably the groove walls 28 and 30 will be left somewhat rough to reduce reflection, and also to facilitate adherence of the phosphors 32 and 33. These phosphors will be the same so as to produce the same color when energized and thereby transmit the same color to both eyes of the observer. The walls 28 and 30 instead of being perfectly straight or flat may be somewhat rounded or curved and will still perform the same functions as though flat. The phosphors 32 and 33 may be deposited by known methods, such as by settling the phosphors on the surfaces, the phosphors 28 being settled with the screen 20 tipped in one inclined position and the phosphors 33 being settled with the screen tipped in the opposite inclined position. It is not essential that the phosphors extend into the extreme bottoms of the V-shaped grooves 22, and such innermost portions may be left uncoated, somewhat as indicated in FIG. 4, and still leave adequate areas for impingement by the respective electrons and the production of the required spots of light on the groove walls 28 and 30. The outermost or flat areas 25 will preferably receive a black conductive coating, for example, an "Aquadag" coating, and this coating may be applied in any appropriate manner, such as by settling or spraying before the grooves 22 are formed or after the phosphors 32 and 33 are applied. This will be true whether the grooves 22 are all formed symmetrically as indicated in FIGS. 3, 3A and 4, or are formed with varying slopes of the respective walls 28 and 30 as the sides of the screen 20 are approached as indicated in FIG. 5. Preferably, the conductive coating on the flat areas 25 is electrically connected to the usual "Aquadag" coating on the inside side walls of the tube.

After production of the screen 20, as indicated, the screen will then be affixed to the peripheral television tube wall 12 or suspended within the tube in any conventional or preferred manner. While the two electron guns 16 and 18 will preferably be disposed as indicated in FIG. 2, that is so that their axes lie in a median horizontal plane as above described, it would be possible to elevate the gun somewhat with respect to such plane and the front wall of the screen 20, or to lower the gun somewhat below such plane, the axes of the gun so located being directed correspondingly angularly downward or upward as the case may be, as well as inwardly toward the middle of the screen. In normal scanning, the respective electron beams impinge respective groove walls 28 and 30 with adequate effect whether the axes of the guns 16 and 18 are disposed in the described median horizontal plane exactly as indicated in FIG. 2, or the guns are located somewhat above or somewhat below such plane, within a range limit of perhaps 30° or 40°, so that the axes are directed somewhat downward or somewhat upward. In any event the effect is substantially the same.

*Operation and use of the television tube*

Assuming installation of a television tube of this improvement in a television receiver used for the benefit of an observer, the electron guns 16 and 18 simultaneously and synchronously scan the screen 20, the scanning movement of each occurring in a substantially conventional manner, but with the significant difference that there is an alternation or delay between the impingement of the electron beams from the electron gun 16 and those from the gun 18. This delay, when using for example 60-cycle alternating current, will be in the order of a sixtieth of a second, impingement of a beam on groove walls 28 in one sweep alternating with impingement of a beam from the other gun on opposite walls 30 in an immediately succeeding sweep, so that the spots of light 36 and 38 indicated in FIGS. 3 and 3A are alternately produced at intervals of a sixtieth of a second, and successive spots of light on the same walls 28 will occur a thirtieth of a second apart. This sequence of operation throughout each operating cycle is below the resolving power of the eye with the result that the effect is a continuous picture production as with ordinary television reception.

As previously indicated, rays of light 36*a* from a spot 36 indicated in FIG. 3 travel through the respective section of the screen 20 to the respective lenticule 24 which, by reason of its curvature on the arc of a circle causes the light rays to pass in parallelism forward to the right eye of the viewer. Similarly, as seen in FIG. 3A, rays from a spot of light 38 pass through the screen 20 and thence in parallelism toward the left eye of the viewer.

The viewer will position himself forward of the front wall 24 of the screen 20 a distance determined by the dimensional relationships of the various parts and surfaces of the screen 20. Assuming a characteristic viewing position now often employed, of about 30 inches in front of the screen, the viewer will seat himself accordingly and will then adjust his head to the right or the left so as to obtain clear vision effects, that is, so that light rays leaving the respective lenticules 24 from spots of light 36 and their rays 36*a* will be picked up by the viewer's right eye, and similarly spots of light 38 and their rays 38*a* will be picked up by the viewer's left eye, the spots 36 being effected by the right-eye electron gun 16 and the spots 38 being effected by the left-eye electron gun 18.

The viewing distance of the observer forward of the screen will depend upon the dimensional aspects and relationships of screen thickness and width of each lenticule 24, the widths of all the lenticules being uniform. The spacing of the grooves 22 on the inner wall of the screen 20 is, of course, the same as the width of the lenticules, as is apparent from the showing.

Since the electron lenses 101 and 102 of the television camera 100 (FIG. 6) described below, are spaced a distance corresponding with the separation of average human eyes, which average separation is about 2½ inches, the relation of this 2½ inch spacing to the viewer's distance from the screen, for example 30 inches, must find the same proportional relationship between the widths of the lenticules 24 and the thickness of the screen 20. Thus, as discussed above in connection with the relative lenticule width or spacing and screen or lens thickness, this may be about 1:12, or more or less as required for a given viewing distance. A ratio of about 1:10, as previously indicated, or 1:15, or 1:20 or otherwise as may be desirable, will be used. Thus, if a lenticule width be $w$, the screen thickness be $t$, the eye spacing (2½ inches) be $s$ and the viewer's distance from the screen 20 be $d$, the relationships will be indicated for example by the formula:

$$\frac{w}{t}=\frac{s}{d}=\frac{1}{12}$$

Therefore, with an eye spacing ($s$) of 2½ inches as indicated, the viewer's distance from the camera ($d$) would be 30 inches to produce the indicated relationship of 1:12. Dimensions in the screen 20 correspond; for example, a lenticule width ($w$) of 0.5 mm. would call for a lens thickness ($t$) of 6 mm. which would be in the range of practical construction.

With the construction of this improvement, two or three viewers may use the same screen 20 by shifting the respective positions of their heads and eyes to one side or the other. Similarly, if a viewing distance of 50 inches were required, the stereoscopic spacing of the two electron lenses of the television camera still being 2½ inches, then the dimensional relationships of the screen could be, for example, a lenticule width ($w$) of 0.2 mm. and a screen thickness ($t$) of 4 mm., the ratios here being 1:20. The width $w$ is required to be that below the resolving power of the eye that the viewer's distance $d$ involves.

It is of course to be appreciated that the obtaining of three-dimensional effects under these conditions amounts effectively to the crossing of the viewer's eyes, and that images are picked up under these circumstances by light beams from the lenticules 24 which pass to the viewer's right eye, for example, crossing light beams from lenticules 24 passing to the viewer's left eye, so that, in effect, the image appears to be seen in the space between the viewer's eyes and the screen 20.

The obtaining of this virtual image is a function of the curvature of the lenticules 24, and these are arcs of a circle which, taken in conjunction with the refractive index of the glass or plastic, pass out the respective light rays in parallelism or substantial parallelism. The curvature of these arcs is determined by the following formula where $r$ equals the radius of the arc, $n$ equals the index of reflection of the screen material 20 and $t$ equals the thickness of the screen 20:

$$r=\frac{n-1}{n}t$$

Since the index of refraction is ordinarily about 1.5, the formula shows that the arc of the circle for each lenticule 24 is about $t/3$, or ⅓ the thickness of the screen 20.

*The camera circuits*

Referring to FIG. 6, there is illustrated in block diagram form an electrical system that may be utilized in presenting a three-dimensional television picture to a viewer by the television tube above disclosed. A television camera and associated components are indicated collectively by the numeral 100, the camera being provided with two electron lenses designated as a right-eye lens 101 and a left-eye lens 102. The axes of the lenses are parallel to each other and are horizontally spaced apart approximately two and one-half inches corresponding to the average spacing of the eyes of a human being. The camera is connected to a transmitter 103 which in turn is connected to an antenna 104.

The television signal is shown as received by a receiver antenna 105 and is conveyed to a conventional receiver including the usual intermediate frequency amplifier, detector, and video amplifier assembly indicated at 106. The output therefrom is communicated to the pair of electron guns 16 and 18 located within the confines of the television or cathode ray tube 10. The signal from the amplifier 106 is communicated to the guns 16 and 18 through lines 115, 116 and 117 to the left-eye gun 18 and through the lines 115, 116, and 118 to the right-eye gun 16.

The signal from the amplifier 106 is also directed to a vertical sync separator 120 which is adapted to filter and clip the signal so as to provide a series of conventional vertical sync pulses. These pulses are communicated to an electronic switch (or flip-flop) 121. This electronic switch 121 is connected to a gate 122 disposed in the line 117 connected to the left-eye gun 18, and also to a gate 123 disposed in the line 118 communicating with the right-eye gun 16.

Referring to the camera and associated components designated by the numeral 100, it receives the images provided by the electron lenses 101 and 102. It will be understood that a conventional camera only has one electron lens and the output signal therefrom provides the usual interlace signals to the transmitter. The present invention, however, utilizes two electron lenses and the signals of each are gated by gates 125 and 126 respectively. The opening and closing of the gates may be conveniently controlled by the vertical sync pulse generated in the camera, whereby each gate will be open for one-sixtieth of a second and then closed for one-sixtieth of a second. Further, the gates are alternately opened and closed so that when gate 125 is open gate 126 is closed, and vice versa. Therefore, the electron signal being received by the camera for the first one-sixtieth of a second will, for example, emanate from the right electron lens; and during the next one-sixtieth of a second the signal will emanate from the left electron lens. The signalling to the gates is coordinated by the vertical sync pulses so that, for example, the right lens 101 will provide the signal during the time of one interlace of the raster and the other lens 102 will provide the signal during the time of the next interlace of the raster, and alternately thereafter.

The opening and closing of the gates 125 and 126 is, as heretofore indicated, controllable by the vertical sync pulses. These vertical sync pulses may be conveyed by a line 130 to a flip-flop 131. The flip-flop is provided with two outputs constituting lines 132 and 133 which are connected respectively to the gates 125 and 126. It will be understood that the flip-flop 131 has two inherently stable conditions. When in one condition, a signal is conveyed by means of line 132 to the gate 125 to turn the gate off, and at the same time there is no signal applied to the line 133 which permits the gate 126 to remain on. When the flip-flop 131 changes to the other stable condition, the signals on lines 132 and 133 are reversed so as to turn gate 126 off and permit gate 125 to turn on. It will be understood, therefore, that as the vertical sync pulses are received by the flip-flop 131, upon each pulse being received the flip-flop will change its stability from one condition to the other, thereby alternately turning gates 125 and 126 on and off alternately.

By the utilization of the gates 125 and 126, the camera will only receive the signal from the gate that is open or on. Accordingly, the double interlace signal provided will be determined successively and alternately by the image scanned by the right lens, and next the image scanned by the left lens.

The video signal ultimately provided is transmitted in the usual manner by the transmitter 103.

The transmitted signal is received by the receiving antenna 105 in the usual manner and conveyed to the receiver 106 which includes the conventional components such as the intermediate frequency amplifier, detector and video amplifier, above mentioned. The video signal is communicated through lines 115, 116, and through line 117 to the left-eye gun 18, and is also conducted through lines 115, 116 and line 118 to the right-eye gun 16. The gates 122 and 123, which are disposed within the lines 117 and 118 respectively, are somewhat analogous to the gates 125 and 126 in the camera. Accordingly, the gates 122 and 123 are alternately on and off as determined by a signal from the flip-flop 121. The flip-flop 121 changes its conditions of stability due to a signal received from the vertical sync separator 120. It will be understood that an appropriate signal may be secured from the amplifier unit 106 providing the vertical sync pulses which may be communicated directly with the flip-flop 121. However, if it is desired to utilize a separate vertical sync separator, this may be done by utilizing the separator 120 which will receive a composite video signal from the amplifier 106.

It will be recognized therefore, that when the camera receives an image from the left lens 102, it will be this signal only that reaches the left-eye gun 18 which scans the screen 20 of the cathode ray tube 10 for one vertical interlace sweep only. During the next one-sixtieth of a second, the image will be received by the right lens 101, and accordingly due to the change of stability effected by the flip-flop 121 in the receiver, the right-eye gun 16 will be operative and provide the next vertical interlace scan.

From the foregoing it is apparent that the right-eye gun 16 at the left of the cathode ray tube 10 and the left-eye gun 18 at the right of the tube 10 alternately sweep the right-eye groove walls 28 of the screen 20 and the left-eye groove walls 30, whereby to yield in one sweep right-eye light rays 36*a* which pass from activated spots 36 to the observer's right eye as parallel rays from right portions of the lenticules 24, and to yield in the next sweep left-eye light rays 38*a* which pass from activated spots 38 to the observer's left eye as parallel rays from left portions of the lenticules 24.

It is also apparent that these actions and results are in synchronism with the effects fed respectively from the right and left electron lenses 101 and 102 of the television camera 100, whereby the viewer of the screen 20 receives a realistically natural three-dimensional reproduction of the subject as viewed by the camera.

What I claim as my invention is:

1. A three-dimensional television screen in the form of a translucent sheet provided on one face with a multiplicity of vertical grooves coated with phosphors and on the opposite face with a multiplicity of aligned vertical corrugations formed on outwardly curved arcs, the spacing of the grooves and the widths of the opposed corrugations conforming and being below the resolving power of the human eye at a viewing distance.

2. A television screen as in claim 1 wherein the grooves are spaced by non-reflective intervening wall portions.

3. A cathode ray tube including:

an enclosing housing;

a transverse vertical translucent viewing screen disposed across an end of said housing; and a pair of electron guns at opposite sides of said housing and directed angularly toward the inner wall of said screen, said inner wall having a multiplicity of vertical phosphor-coated grooves spaced by non-reflective portions of said inner wall, said guns being directed respectively toward the opposite sides of the various grooves for respective energization of the phosphors on such sides, and a multiplicity of outwardly arced vertical corrugations on the outer wall of said screen, with the spacing of said grooves and the widths of said vertical corrugations substantially equal and uniform.

4. A cathode ray tube including: an enclosing housing; a transverse vertical translucent viewing screen disposed across an end of said housing; and a pair of electron guns at opposite sides of said housing and directed angularly toward the inner wall of said screen, said inner wall having a multiplicity of vertical phosphor-coated grooves, said guns being directed respectively toward the opposite sides of the various grooves for respective energization of the phosphors on such sides, and a multiplicity of outwardly arced vertical corrugations on the outer wall of said screen.

5. A cathode ray tube as in claim 4 wherein the spacing of said grooves and the widths of said vertical corrugations are substantially equal and uniform.

6. A cathode ray tube as in claim 4 wherein said grooves are spaced by longitudinal vertical intervening portions of said inner wall and such portions are rendered non-reflective.

7. A cathode ray tube as in claim 4 wherein the arcs of said corrugations are formed on a radius to direct light rays outward in parallelism from the respective corrugations.

8. A cathode ray tube as in claim 7 wherein the widths of said corrugations are below the resolving power of the eye.

9. A cathode ray tube as in claim 4 wherein the angles of said electron guns with respect to the inner wall of the screen and the angles of said grooves are small enough to avoid striking of the nearest wall of each groove by beams from the respective electron gun.

10. A cathode ray tube as in claim 4 wherein the curvature of the arcs on said corrugations is established by the formula:

$$r=\frac{n-1}{n}t$$

where $r$ is the radius of the arc, $n$ is the index of refraction of the translucent material of the screen, and $t$ is the thickness of the screen.

11. A cathode ray tube as in claim 10 wherein the widths of said corrugations are below the resolving power of the human eye at a viewing distance in front of the screen.

12. A television tube including: an enclosing housing; a vertical translucent viewing screen secured at the front of said housing, the inner wall of said screen having a multiplicity of vertical grooves provided with electron-energizable phosphors on the sides thereof, and the outer wall of said screen having a multiplicity of vertical outwardly rounded lenticular elements disposed forward of said grooves to pass light rays forward from said screen; and electron guns disposed at opposite sides of said tube with their projection axes directed angularly respectively toward the opposite side walls of said grooves for energization of the phosphors thereon by respective electron beams, said guns being disposed in a plane generally perpendicular to said grooves.

13. A television tube as in claim 12 wherein the widths of said grooves and lenticular elements are below the resolving power of the eye, and the curvature of said elements passes light rays forward from the screen in substantially parallel relationship.

14. A television tube as in claim 12 wherein vertically elongated barrier walls constituting portions of said inner screen wall separate said grooves.

15. In a cathode ray tube for a three-dimensional television system, the combination of:

an enclosing housing;

a viewing screen in the form of a translucent sheet disposed across an end of said housing, said sheet having a plurality of parallel phosphor-coated grooves on the inner face thereof and a corresponding plurality of parallel lenticular corrugations on the outer face thereof, with the light beams generated by the phosphor on adjacent walls of adjacent grooves passing out of said sheet through the same corrugation, and with the width of said corrugations below the resolving power of the eye;

and a pair of electron guns mounted in said housing for projecting electron beams substantially in a plane perpendicular to said sheet and to said grooves, with the beam from one of said guns directed from one side of the center of said sheet at an acute angle to said sheet for impinging on one wall of said grooves and with the beam from the other of said guns directed from the other side of the center line of said sheet at an acute angle to said sheet for impinging on the other wall of said grooves.

References Cited by the Examiner

UNITED STATES PATENTS

| | | | |
|---|---|---|---|
| 2,301,254 | 11/42 | Carnahan | 178—6.5 |
| 2,480,848 | 9/49 | Geer | 313—70 |
| 2,510,344 | 6/50 | Law | 88—28.93 |
| 2,544,690 | 3/51 | Koch et al. | 313—70 |
| 2,558,120 | 6/51 | Acosta | 313—70 X |
| 2,560,538 | 7/51 | Ayres | 88—29 X |
| 2,696,523 | 12/54 | Theile | 178—6.8 |
| 2,728,013 | 12/55 | Tourshou | 313—92 |
| 2,783,406 | 2/57 | Vanderhooft | 313—70 |
| 2,798,115 | 7/57 | Wiens | 315—9 X |
| 3,054,900 | 9/62 | Orthuber | 313—101 X |

GEORGE N. WESTBY, *Primary Examiner.*

ARTHUR GAUSS, *Examiner.*